United States Patent
Bitauld (10) Patent No.: US 11,244,054 B2
(45) Date of Patent: Feb. 8, 2022

(54) METHOD AND APPARATUS FOR TRUSTED COMPUTING

(71) Applicant: Nokia Technologies Oy, Espoo (FI)

(72) Inventor: David Bitauld, Massy (FR)

(73) Assignee: Nokia Technologies Oy, Espoo (FI)

( * ) Notice: Subject to any disclaimer, the term of this patent is extended or adjusted under 35 U.S.C. 154(b) by 86 days.

(21) Appl. No.: 16/760,795

(22) PCT Filed: Nov. 3, 2017

(86) PCT No.: PCT/CN2017/109289
§ 371 (c)(1),
(2) Date: Apr. 30, 2020

(87) PCT Pub. No.: WO2019/084908
PCT Pub. Date: May 9, 2019

(65) Prior Publication Data
US 2020/0327230 A1 Oct. 15, 2020

(51) Int. Cl.
*H04L 9/00* (2006.01)
*G06F 21/57* (2013.01)

(52) U.S. Cl.
CPC ........ *G06F 21/57* (2013.01); *G06F 2221/033* (2013.01)

(58) Field of Classification Search
CPC ..... G06F 21/57; G06F 2221/033; G06F 21/64
See application file for complete search history.

(56) References Cited

U.S. PATENT DOCUMENTS 8,185,750 B2 * 5/2012 Bade .................... G06F 21/572
713/191
9,367,701 B2 6/2016 Merchan et al.
(Continued)

FOREIGN PATENT DOCUMENTS

CN 106454528 A 2/2017
CN 106899552 A 6/2017
(Continued)

OTHER PUBLICATIONS

"Trusted execution environment", Wikipedia, Retrieved on Apr. 21, 2020, Webpage available at : https://en.wikipedia.org/wiki/Trusted_execution_environment.
(Continued)

*Primary Examiner* — Beemnet W Dada
(74) *Attorney, Agent, or Firm* — Nokia Technologies Oy (57) ABSTRACT

Apparatus, method, computer program product and computer readable medium are disclosed for trusted computing. A method comprises: at a trusted execution environment (TEE)-enabling processor, creating a signing TEE; performing a first measurement of the signing TEE, wherein the first measurement comprises at least one measurement of the code of the signing TEE, an identity of the signing TEE and a log of activities performing during the creation of the signing TEE; generating a first signature of the result of the first measurement; sending the result of the first measurement and the first signature to a public register such that a verification of the signing TEE can be made by means of the public register; wherein the signing TEE is configured to verify whether a first TEE is recorded on the public ledger.

19 Claims, 5 Drawing Sheets

(56) References Cited

U.S. PATENT DOCUMENTS

| | | |
|---|---|---|
| 2016/0036826 A1 | 2/2016 | Pogorelik et al. |
| 2016/0188350 A1 | 6/2016 | Shah et al. |
| 2016/0188873 A1 | 6/2016 | Smith et al. |
| 2016/0275461 A1 | 9/2016 | Sprague et al. |
| 2016/0283920 A1 | 9/2016 | Fisher et al. |
| 2016/0365981 A1 | 12/2016 | Medvinsky et al. |
| 2019/0140846 A1* | 5/2019 | Moore ............ H04L 9/3265 |
| 2019/0243950 A1* | 8/2019 | Soriente ............ G06F 21/577 |
| 2020/0162268 A1* | 5/2020 | Wentz ............ H04L 9/3239 |

FOREIGN PATENT DOCUMENTS

| | | |
|---|---|---|
| EP | 1303802 A1 | 4/2003 |
| WO | 02/08873 A1 | 1/2002 |
| WO | 2016/048177 A1 | 3/2016 |
| WO | 2016/195880 A1 | 12/2016 |
| WO | 2018/058441 A1 | 4/2018 |

OTHER PUBLICATIONS

Anati et al., "Innovative Technology for CPU Based Attestation and Sealing", Intel Software Guard Extensions Documentation, Aug. 14, 2013, pp. 1-7.

Rijswijk-Deij et al., "Using Trusted Execution Environments in Two-factor Authentication: Comparing Approaches", Open Identity Summit, Sep. 2013, pp. 1-12.

International Search Report and Written Opinion received for corresponding Patent Cooperation Treaty Application No. PCT/CN2017/109289, dated Jul. 31, 2018, 10 pages.

Extended European Search Report received for corresponding European Patent Application No. 17930805.1, dated May 3, 2021, 8 pages.

* cited by examiner

METHOD AND APPARATUS FOR TRUSTED COMPUTING

RELATED APPLICATION

This application claims priority to PCT Application No. PCT/CN2017/109289, filed on Nov. 3, 2017, of which is incorporated herein by reference in its entirety.

FIELD OF THE INVENTION

The present disclosure generally relates to information technology. More specifically, the present disclosure relates to method and apparatus for trusted computing.

BACKGROUND

The fast growth of information technology has dramatically changed people's daily life. More and more data may be generated or owned by users which may be critical to the success of various services such as Digital Health (DH), marketing, digital content protection, mobile finance, and authentication. For example, DH progress may be based on the insights extracted/mined from the data. However many users may be reluctant to provide these data due to lack of trust or privacy protection. As an example, phenomenal advances in medical sciences and preventive health could be expected if people shared information about their health. However, this may include sensitive information they are not ready to disclose with any other person or organization. People may only allow companies and research organizations to use their data if they are certain their personal information will remain secret. Unfortunately it is difficult to trust the organization that physically hosts the hardware and software for processing the data.

Trusted computing allows data to be processed, while being shielded from the processor owner. However the control over this isolated execution is completely in the hands of the service provider i.e. the entity that developed and digitally signed the trusted computing code. This poses a trust problem if any users are required to provide data to be processed with this code as they have to place their trust with a single third party.

Thus, it would be an advancement to provide an improved solution for trusted computing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method. The method comprises, at a trusted execution environment (TEE)-enabling processor, creating a signing TEE; performing a first measurement of the signing TEE, wherein the first measurement comprises at least one measurement of the code of the signing TEE, an identity of the signing TEE and a log of activities performing during the creation of the signing TEE; generating a first signature of the result of the first measurement; sending the result of the first measurement and the first signature to a public register such that a verification of the signing TEE can be made by means of the public register; wherein the signing TEE is configured to verify whether a first TEE is recorded on the public ledger.

In an embodiment, the method further comprises receiving the code of the first TEE and at least one signature associated with the code of the first TEE; determining, by the signing TEE, whether the code of the first TEE is recorded on the public ledger based on the at least one signature; signing, by the signing TEE, the first TEE when the code of the first TEE is recorded on the public ledger; creating the first TEE; performing a second measurement of the first TEE, wherein the second measurement comprises at least one measurement of the code of the first TEE, an identity of the first TEE and logs of activities performing during the creation of the first TEE; generating a second signature of the result of the second measurement; and sending the result of the second measurement and the second signature to the public register a verification of the first TEE can be made by means of the public register.

In an embodiment, creating a signing TEE comprises: receiving, from a provider of the signing TEE, the code of the signing TEE and a signature of the code of the signing TEE; verifying the signature of the code of the signing TEE; and creating the signing TEE when the verification of the signature of the code of the signing TEE is positive.

In an embodiment, sending the result of the second measurement and the second signature to the public register comprises: sending the result of the first measurement and the first signature to the provider of the signing TEE such that the provider of the signing TEE can verify the first signature with the help of a manufacturer certification service of the TEE-enabling processor and forward the result of the first measurement and the first signature to the public register.

In an embodiment, the service provider registers with the manufacturer certification service of the TEE-enabling processor and is identified with the service provider's public key.

In an embodiment, the TEE-enabling processor produces a private-public key pair, the public key is used to identify the TEE-enabling processor and the TEE-enabling processor is certified by a manufacturer certification service of the TEE-enabling processor.

In an embodiment, the result of the first measurement and/or the result of the second measurement is stored and communicated as a hash.

In an embodiment, the verification of the signing TEE comprises checking at least one of the code of the signing TEE, the result of the first measurement of the signing TEE, the validity of the first signature and the provenance of the first signature.

In an embodiment, the verification of the first TEE comprises checking at least one of the code of the first TEE, the result of the second measurement of the first TEE, the validity of the second signature and the provenance of the second signature.

In an embodiment, the method further comprises: receiving data from a data owner, wherein the data is encrypted with a public key of the first TEE.

In an embodiment, the public register is a website with https authentication or a distributed ledger controlled by a blockchain smart contract.

In an embodiment, the distributed ledger contains lists of the TEE-enabling processor, approved TEE codes, and auditors, and the smart contract contains at least one rule to modify the lists.

In an embodiment, the data used by the first TEE is stored and encrypted with a secret key related to the signing TEE or the first TEE.

In an embodiment, the data used by the first TEE is encrypted with a secret key related to the signing TEE and a second TEE is signed by the signing TEE, the method further comprises: sending the stored data to the second TEE.

In an embodiment, the verification of the signing TEE, the verification of the first TEE and the at least one signature associated with the code of the first TEE are made by at least one of a board of auditors, a data owner and a trusted user.

According to second aspect of the disclosure, it is provided an apparatus capable of providing trusted execution environment (TEE). The apparatus comprises: a creating element configured to create a signing TEE; a measurement element configured to performing a first measurement of the signing TEE, wherein the first measurement comprises at least one measurement of the code of the signing TEE, an identity of the signing TEE and a log of activities performing during the creation of the signing TEE; a signature element configured to generating a first signature of the result of the first measurement; a sending element configured to send the result of the first measurement and the first signature to a public register such that a verification of the signing TEE can be made by means of the public register; wherein the signing TEE is configured to verify whether a first TEE is recorded on the public ledger.

In an embodiment, the apparatus further comprises: a receiving element configured to receive the code of the first TEE and at least one signature associated with the code of the first TEE; the signing TEE further configured to determine whether the code of the first TEE is recorded on the public ledger based on the at least one signature; the signing TEE further configured to sign the first TEE when the code of the first TEE is recorded on the public ledger; the creating element further configured to create the first TEE; the measurement element further configured to perform a second measurement of the first TEE, wherein the second measurement comprises at least one measurement of the code of the first TEE, an identity of the first TEE and logs of activities performing during the creation of the first TEE; the generating element further configured to generating a second signature of the result of the second measurement; and the sending element further configured to sending the result of the second measurement and the second signature to the public register such that a verification of the first TEE can be made by means of the public register.

In an embodiment, the apparatus further comprises: the receiving element further configured to receive, from a provider of the signing TEE, the code of the signing TEE and a signature of the code of the signing TEE; a verifying element configured to verify the signature of the code of the signing TEE; and the creating element further configured to create the signing TEE when the verification of the signature of the signing TEE is positive.

In an embodiment, the apparatus further comprises: the sending element further configured to send the result of the first measurement and the first signature to the provider of the signing TEE such that the provider of the signing TEE can verify the first signature with the help of a manufacturer certification service of the TEE-enabling processor and forward the result of the first measurement and the first signature to the public register.

In an embodiment, the service provider registers with the manufacturer certification service of the TEE-enabling processor and is identified with the service provider's public key.

In an embodiment, the TEE-enabling processor produces a private-public key pair, the public key is used to identify the TEE-enabling processor and the TEE-enabling processor is certified by a manufacturer certification service of the TEE-enabling processor.

In an embodiment, the result of the first measurement and/or the result of the second measurement is stored and communicated as a hash.

In an embodiment, the verification of the signing TEE comprises checking at least one of the code of the signing TEE, the result of the first measurement of the signing TEE, the validity of the first signature and the provenance of the first signature.

In an embodiment, the verification of the first TEE comprises checking at least one of the code of the first TEE, the result of the second measurement of the first TEE, the validity of the second signature and the provenance of the second signature.

In an embodiment, the receiving element is configured to receive data from a data owner, wherein the data is encrypted with a public key of the first TEE.

In an embodiment, the public register is a website with https authentication or a distributed ledger controlled by a blockchain smart contract.

In an embodiment, the distributed ledger contains lists of the TEE-enabling processor, approved TEE codes, and auditors, and the smart contract contains at least one rule to modify the lists.

In an embodiment, the data used by the first TEE is stored and encrypted with a secret key related to the signing TEE or the first TEE.

In an embodiment, the data used by the first TEE is encrypted with a secret key related to the signing TEE and a second TEE is signed by the signing TEE, the sending element is further configured to send the stored data to the second TEE.

In an embodiment, the verification of the signing TEE, the verification of the first TEE and the at least one signature associated with the code of the first TEE are made by at least one of a board of auditors, a data owner and a trusted user.

According to a third aspect of the present disclosure, it is provided a computer-readable storage medium carrying one or more sequences of one or more instructions which, when executed by a trusted execution environment (TEE)-enabling processor, cause the TEE-enabling processor to execute the method as described above.

According to a fourth aspect of the present disclosure, it is provided a computer program product comprising one or more sequences of one or more instructions which, when executed by a trusted execution environment (TEE)-enabling processor, cause the TEE-enabling processor to execute the method as described above.

According to a fifth aspect of the present disclosure, it is provided an apparatus comprising means configured to execute the method as described above.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As used herein, digital signatures are unique to a signer. Digital signature solution providers follow a specific protocol, called Public Key Infrastructure (PKI). PKI requires the provider to use a mathematical algorithm to generate two long numbers, called keys. One key is public, and one key is private. When a signer electronically signs a document, the signature is created using the signer's private key, which is always securely kept by the signer. The mathematical algorithm acts like a cipher, creating data matching the signed document, called a hash, and encrypting that data. The resulting encrypted data is the digital signature. The signature is also marked with the time that the document was signed. If the document changes after signing, the digital signature is invalidated. It is noted that digital signature solution may be any suitable existing or further developed digital signature solution. The disclosure has no limit on it.

Figure 2:
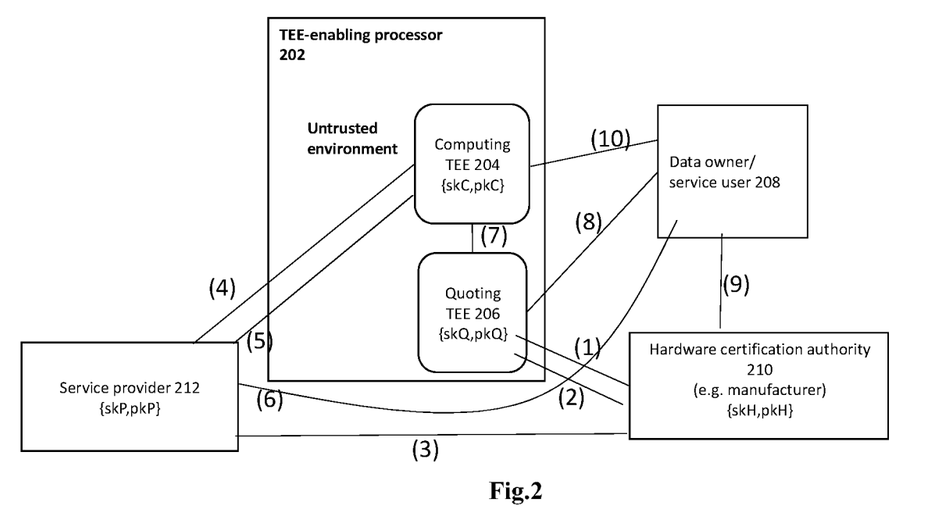
FIG. 2 depicts a schematic system for providing users with a technical proof of how the data will be processed.

FIG. 2 depicts a schematic system for providing users with a technical proof of how the data will be processed.

As shown in FIG. 2, a trusted execution environments (TEE)-enabling processor 202 such as the Intel® Software Guard Extensions (Intel® SGX) architecture allows the creation of shielded areas within the normal untrusted operating system. A particular type of TEE is a Quoting TEE 206 such as Quoting enclave of Intel® SGX architecture, which is programmed by the manufacturer of the TEE-enabling processor, provided with the TEE-enabling processor and cannot be reprogrammed. The Quoting TEE 206 is authenticated by a hardware certification authority 210 of the TEE-enabling processor 202 and used to prove the provenance of the measurements of computing TEE 204 coming from this TEE-enabling processor 202. The Quoting TEE 206 may be used for remote attestation.

The process for providing users with a technical proof of how the data will be processed may be as follows:

At step (1), the TEE-enabling processor 202 is provided with the Quoting TEE 206 that is in charge of proving the identity of the TEE-enabling processor 202 and attest that other computing TEEs 204 on the TEE-enabling processor 202 are indeed running on this the TEE-enabling processor 202.

At step (2), the Quoting TEE 206 produces a private-public key pair {skQ,pkQ} (a group signing key pair in the case of Intel SGX). The public key pkQ is used to identify the TEE and thus the TEE-enabling processor 202. The Quoting TEE 206 is certified by the hardware certification authority 210. Then the TEE-enabling processor 202 is integrated by a vendor in a computing device such as a server. The computing device is delivered to an owner. The owner can use the computing device to provide the end service or offer the computing power of this computing device as a cloud facility to a service provider 212. This service provider 212 (owner or cloud user), generates a private-public key pair {skP,pkP}.

At step (3), the service provider 212 registers with the hardware certification authority 210 and is identified with the public key pKP.

At step (4), the service provider 212 writes the code of a computing TEE 204 and signs the code of the computing TEE 204. Then the service provider 212 sends the code of the computing TEE 204 and the signature to the TEE-enabling processor 202.

At step (5), the TEE-enabling processor 202 verifies the signature and creates the computing TEE 204. At creation, the computing TEE 204 generates a private-public key pair {skC,pkC} and then communicate its public key pkC to the service provider 212.

At step (6), the service provider 212 can forward the public key pkC to a data owner/service user 208.

At step (7), upon request of the service provider 212 or the data owner 208, the TEE-enabling processor 202 performs a measurement of the computing TEE 204 and sends the measurement result to the quoting TEE 206 which signs the computing TEE 204.

At step (8), the code of the computing TEE 204, the measurement and the signatures are sent to the data owner/service user 208.

At step (9), the service user 208 can verify the signature with the help of the hardware certification authority 210. The data owner can therefore know how its data are going to be processed before sharing the data.

However there are some problems with the schematic system as shown in FIG. 2:
- service users need to figure out by themselves what the code of the computing TEE does and verify what the technical proof is;
- the computing TEE cannot be updated or modified. If a different computation needs to be done with the same data, the whole process, including asking for the data, has to be followed again;
- each computing TEE has to be signed by the service provider.

In order to overcome at least one of the above problems or other problems, the embodiments of the disclosure provide a trusted computing system that introduces more functionalities that can make the trusted computing system more practical:

A public register (e.g. secured website, blockchain platform, a cloud folder accessible by all the participants) publicizing all the technical proofs;

A board of auditors allowing the non-expert users to place their trust in the board of auditors rather than relying on themselves or a single third party. Because normal users may not have the expertise to verify the TEE by themselves, the board of auditors could be selected to make the technical verifications. In order to build trust with the users, the choice of auditors may be as diverse as possible ranging from trusted companies to governmental organisms, regulators or independent associations. Each board member can officialize its opinion about the TEE (e.g. trustworthy, not trustworthy, not tested). In addition, the board of auditors can be selected/elected by the users;

An intermediate TEE called signing TEE allowing automatization of the TEE approval and possibility of updates without losing data, while keeping the service provider isolated from the data. The role of the signing TEE is to check if a computing TEE has been approved by the board of auditors before signing the computing TEE. The computing TEEs are therefore signed with a secret key that is already in the processor (i.e. the signing TEE) and will never be seen by any third party.

Different technical proofs may be provided to the auditors and then the users in the form of hashes and digital signatures:

The code and measurement of the TEE may be provided in the form of a hash by the TEE-enabling processor;

The fact that the measurement is provided by a TEE-enabling processor is proven by a signature of the TEE-enabling processor which is authenticated by the manufacturer of the TEE-enabling processor;

The fact that the TEEs have been audited and approved is proven by the signatures of the board of auditors.

The validity of the digital signatures can be checked by anyone with the corresponding public key and the identity of the signer is authenticated with the public key by certification authorities (the manufacturer of the TEE-enabling processor in the case of the Quoting TEE). The signatures cannot be faked by anyone not in possession of the private key.

In principle, the service users don't need to trust the auditors (or their certification authority) if they are expert enough. They still need to trust the fact that the manufacturer has done a secure processor but they don't need to trust a third party or human agent with access to their data.

The list of technical proofs can be provided directly to the user or made public in a secure register such as a transport layer security (TLS) protected website, a blockchain smart contract ledger, a shared cloud account.

The data may be encrypted (or "sealed") with a secret key related to the signing TEE or with a secret key related to the computing TEE to store for example when the TEE is not used or for large amounts of data. The consequence that the data used by a given computing TEE is encrypted with a secret key related to the signing TEE is that the data can be decrypted by an updated version of the computing TEE as long as the updated computing TEE is signed by the same signing TEE. This allows the service provider to update the computing TEE without asking for the data again. When the data is encrypted with the secret key related to the computing TEE, the data cannot be transferred from a computing TEE to another computing TEE so that the data owner knows the data it shared with the computing TEE will not be moved to a different unknown TEE.

Figure 1:
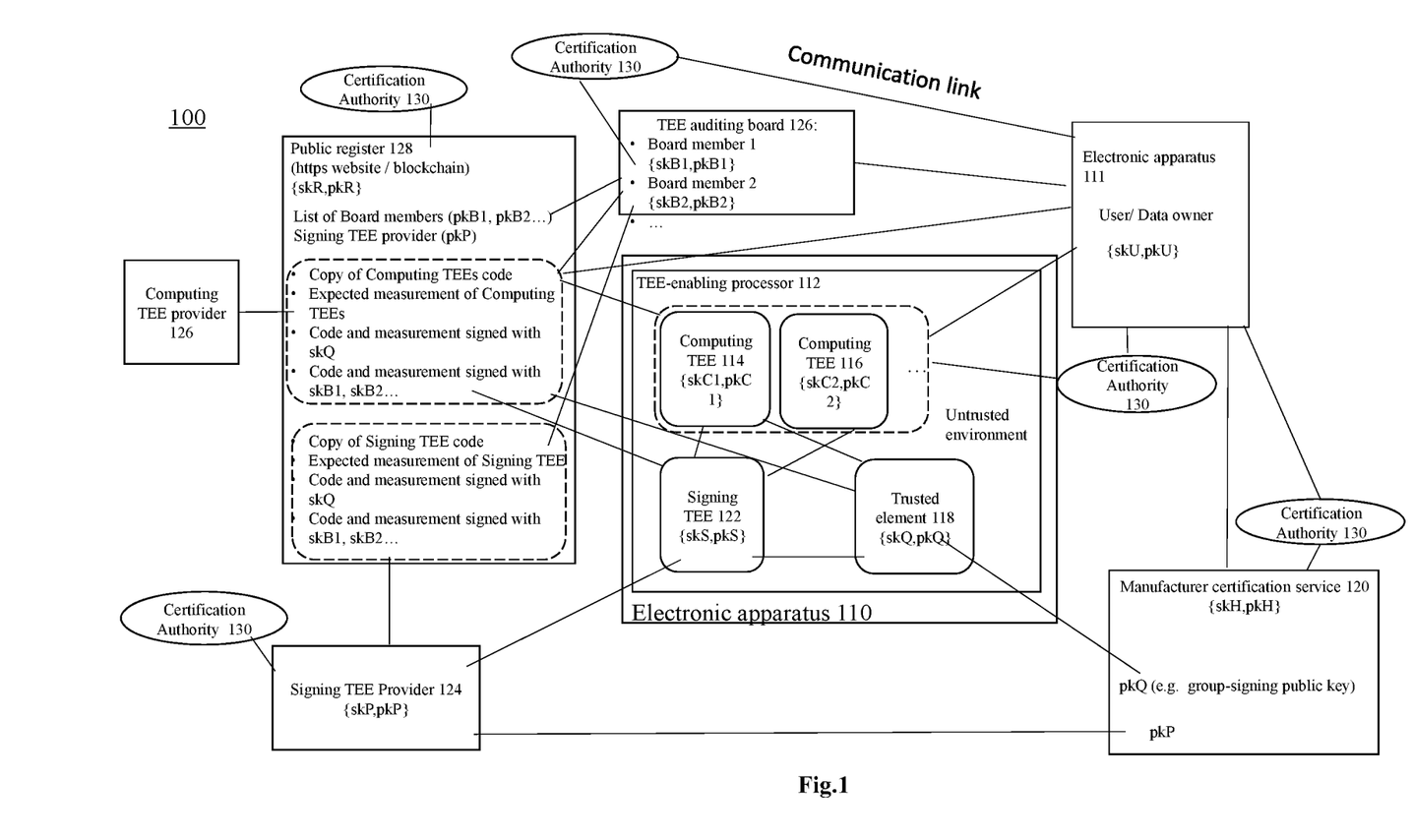
FIG. 1 depicts a schematic system, in which some embodiments of the present disclosure can be implemented.

FIG. 1 depicts a schematic system, in which some embodiments of the present disclosure can be implemented. As shown in FIG. 1, the system 100 may comprise a first electronic apparatus 111 used by a user/data owner, which is operably connected to a second electronic apparatus 110 through a communication link. It should be understood, however, that the electronic apparatus 111 and 110 as illustrated and hereinafter described is merely illustrative of an apparatus that could benefit from embodiments of the disclosure and, therefore, should not be taken to limit the scope of the disclosure. While the first electronic apparatus 111 and the second electronic apparatus 110 are illustrated and will be hereinafter described for purposes of example, other types of apparatuses may readily employ embodiments of the disclosure. The first electronic apparatus 111 and the second electronic apparatus 110 may be a portable digital assistant (PDAs), a user equipment, a mobile computer, a desktop computer, a smart television, a gaming apparatus, a laptop computer, a media player, a camera, a video recorder, a mobile phone, a global positioning system (GPS) apparatus, a smart phone, a tablet, a server, a thin client, a cloud computer, a virtual server, a set-top box, a computing device, a distributed system, a sensor, a smart glass, a vehicle navigation system and/or any other types of electronic systems. The first electronic apparatus 111 and the second electronic apparatus 110 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments. Additionally, the first electronic apparatus 111 may transmit data such as sensitive data or other data to the second electronic apparatus 110. In general, the first electronic apparatus 111 may a device used by a user and the second electronic apparatus 110 may be a server. Although not shown in FIG. 1, there can be two or more electronic apparatuses 111.

The second electronic apparatus 110 may comprise a trusted execution environment (TEE)-enabling processor 112 such as the Intel® Software Guard Extensions (Intel® SGX) architecture, the ARM TrustZone with a trusted environment or other type of TEE-enabling processor. TEEs are protected areas within the TEE-enabling processor 112. For example, Enclave of the Intel® SGX architecture is an example of TEE which may have three characteristics:

Identity: The TEE can prove its identity, which may comprise two parts:

An identifier related to the TEE-enabling processor it is running on. This can be provided by a manufacturer certification service of the TEE-enabling processor An identifier related to the TEE provider who signed the code of the TEE Data isolation: The data processed within these areas are not directly accessible by other applications running in the normal (non-trusted) part of the TEE-enabling processor, even with the highest privilege level. TEE can also be used to create secret keys that never leave the trusted environment and can be used to encrypt data in order to store it in the untrusted part.

Integrity: The code running in the TEE cannot be tampered with by any application running in the non-trusted part of the TEE-enabling processor, even applications with the highest privilege. This means that the TEE is not under control of the owner of the TEE-enabling processor. By contrast, the TEE provider, i.e. the entity that wrote the TEE code and signed it, has the possibility to modify the TEE.

The TEE-enabling processor 112 allows the creation of shielded areas within the normal untrusted operating system. The TEE creation as well as interactions of the TEE with the outside world may be done by untrusted applications running on the normal operating system. However these applications are in no way able to see or tamper with the code and data of the TEE. They can also be made oblivious to the data they communicate with end-to-end encryption between the TEE and the users.

The TEE-enabling processor may comprise a trusted element or trusted computing base (TCB) 118 such as Quoting Enclave of the Intel® SGX technology which is programmed by the manufacturer of the TEE-enabling processor 112, provided with the TEE-enabling processor 112 and cannot be reprogrammed. The trusted element 118 may be authenticated by the manufacturer certification service 120 of the TEE-enabling processor and used to prove the provenance of the measurement of the TEE coming from this TEE-enabling processor. The trusted element 118 may produce a private-public key pair {skQ,pkQ}, wherein pkQ may be a group signing public key. The public key pkQ may be used to identify the TEE-enabling processor 112. In addition, the public key pkQ can also be used to encrypt communication to the trusted element 118. The trusted element 118 may be used for remote attestation. Attestation is the process of demonstrating that a piece of software has been properly instantiated on the TEE. By attestation, another party can gain confidence that the correct software is securely running within the TEE.

In addition to the element 118, the TEE-enabling processor 112 can comprise one or more other TEEs, such as a signing TEE 122 and computing TEEs 114 and 116 (referred to as first TEE or second TEE herein), each of which can be designed to perform any desired functionality. The functions that may be performed by the TEE can be designed by anyone, such as the service provider or external entities, researchers, data analysts, marketers. The functions of the signing TEE and the computing TEE will be described hereafter.

It is noted that the type of the TEE-enabling processor 112 can also be adapted for the second electronic apparatus 110. Moreover, the TEE-enabling processor 112 can be implemented by using any other suitable existing or future technologies such as ARM TrustZone or Intel® SGX architecture.

The system may further comprise a provider 124 of the signing TEE. The signing TEE 122 allows automatization of the TEE approval by the board of auditors 126 and possibility of updates of the TEE without losing data, while keeping the service provider isolated from the data. The code of the signing TEE may be provided by the provider 124 of the signing TEE to fulfill the need of the signing TEE and is signed with the secret key of the provider 124 of the signing TEE. In order to create the signing TEE, the provider 124 may need to register with the manufacturer certification service 120 so that the provider 124 can be authenticated with an asymmetric key pair #{skP,pkP}. The code of the signing TEE may be sent to the TEE-enabling processor together with an application that will run in the non-trusted part of the processor and take care of triggering the creation of the signing TEE and communicate with the outside world. At creation, the signing TEE creates an asymmetric key pair {skS, pkS}. Upon request of e.g. the provider 124, the TEE-enabling processor can perform a measurement of the signing TEE 122. This measurement may contain the code of the signing TEE, its identity such as the signature produced by the provider 124 and logs of all activities performed during the creation of the signing TEE. The result of the measurement can be stored and communicated as a hash. After that, the TEE and its measurement doesn't change.

The system may further comprise a provider 126 of a computing TEE. The computing TEE can be designed to perform any desired functionality. The code of the computing TEE is provided by the provider 126 to fulfill the need of the computing TEE. The code of the computing TEE may be verified by at least one verifier such as anybody, the board of auditors, the data owner and a trusted user. If the computing TEE code is verified to perform what it is supposed to i.e. what is explained in plain language, then the at least one verifier signs it with respective secret keys.

The system may further comprise a public register 128. The public register 128 may be a website with https authentication, a blockchain ledger, or other suitable public platform. It provides potential users of the TEE with all the information they require to verify that the TEE will perform the computation it claims to perform. Depending on the application, the term "public" may mean visible to anyone or visible to a limited number of entities with access control. For example, the public register 120 may store a copy of the TEE code, the measurement of the TEE, the signature related to the TEE and information about at least one verifier such as a board member's opinion about the TEE.

In an embodiment, the public register 120 may be a blockchain platform. The blockchain platform is a decentralized platform that runs smart contracts. Once two or more parties consent to all of the terms within the contract, they cryptographically sign the smart contract and deploy it to a distributed ledger. When a condition specified in the code is met, a corresponding action may be automatically triggered.

It is noted that the public register 120 is shown as one entity, but in other embodiments it may be a decentralized platform which may be distributed in a plurality of apparatuses.

Turn to FIG. 1, the communication links may be commination links of any suitable communication network. Examples of the communication network may include any wired or wireless network or their combination, including, but not limited to, a wireless cellular telephone network (such as the global system for mobile communications (GSM) network, 3rd generation (3G) network, 3.5th generation (3.5G) network, 4th generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, an Ethernet local area network, a token ring local area network, a wide area network, and the Internet. In addition, the communication between the any two elements of system 100 may be encrypted.

The system may further comprise a certification authority (CA) 130 which is an entity that issues digital certificates. A digital certificate certifies the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate.

Figure 3:
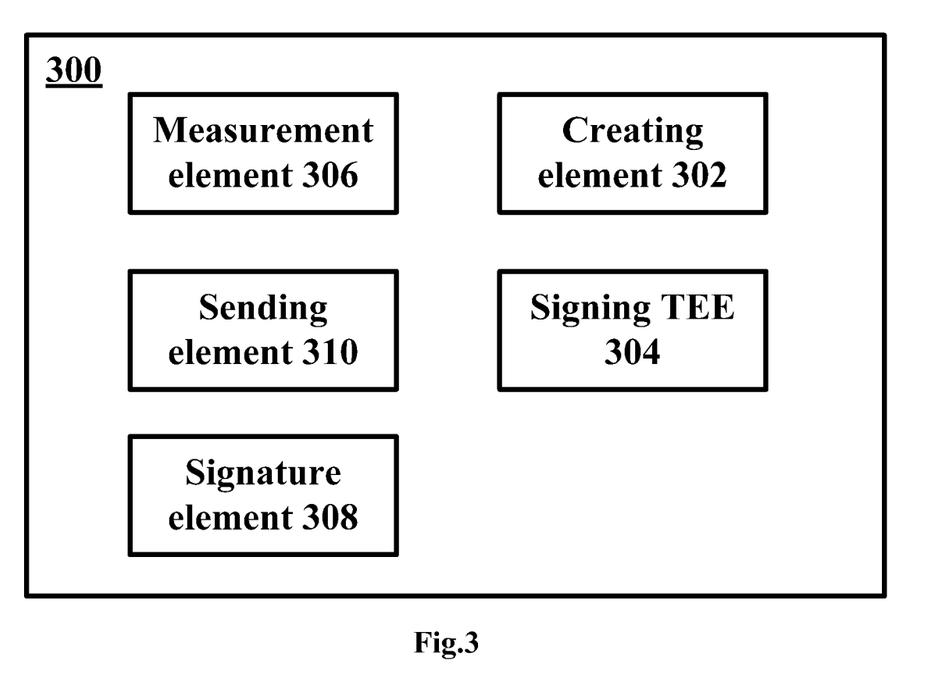
FIG. 3 depicts a simplified block diagram of an apparatus which is suitable for using in practicing the exemplary embodiments of the present disclosure.

FIG. 3 illustrates a simplified block diagram of an apparatus which is suitable for using in practicing the exemplary embodiments of the present disclosure. The apparatus 300 can be implemented as the TEE-enabling processor 112 as shown in FIG. 1.

The apparatus 300 may comprise a creating element 302 configured to create a signing TEE 304. The role of the signing TEE may be to verify that other TEEs called computing TEEs are recorded on the public ledger. In an embodiment, the signing TEE may be programmed by the manufacturer of the TEE-enabling processor and provided with the TEE-enabling processor. The signing TEE may be authenticated by the manufacturer of the TEE-enabling processor.

The signing TEE 304 may generate a private-public key pair {skS,pkS} when the signing TEE is created. The public key pkS may be sent to any suitable entity such as the provider of the signing TEE.

The apparatus 300 may further comprise a measurement element 306 configured to perform a first measurement of the signing TEE 304, wherein the first measurement may comprise at least one measurement of the code of the signing TEE 304, an identity of the signing TEE such as the public key pkS, and a log of activities performing during the creation of the signing TEE.

The apparatus 300 may further comprise a signature element 308 configured to generate a first signature of the result of the first measurement. For example, the generating element 308 may use the private key of the TEE-enabling processor, i.e., the private key of the trusted element 118, to generate the first signature of the result of the first measurement.

The apparatus 300 may further comprise a sending element 310 configured to send the result of the first measurement and the first signature to a public register such that a verification of the signing TEE can be made by means of the public register. For example, the sending element 310 may directly send the result of the first measurement and the first signature to the public register such that at least one verifier such as anybody, the board of auditors, the data owner and a trusted user can verify the signing TEE by means of the public register.

In another embodiment, the sending element 310 may send the result of the first measurement and the first signature to the provider of the signing TEE such that the provider of the signing TEE can verify the first signature with the help of a manufacturer certification service of the TEE-enabling processor. As mentioned above, since the trusted element 118 may be certified by the manufacturer certification service of the TEE-enabling processor, the provider of the signing TEE can obtain the public key of the trusted element 118 from the manufacturer certification service and then verify the first signature. In addition, the provider of the signing TEE can forward the result of the first measurement and the first signature to the public register together with the code of the signing TEE.

The verification of the signing TEE may comprise checking at least one of the code of the signing TEE, the result of the first measurement of the signing TEE, the validity of the first signature and its provenance with the manufacturer certification service. If the auditors believe the signing TEE is trustworthy, the auditors may sign the code of the signing TEE and the first measurement, and record their signatures on the public register. The auditors can officialise their opinions about the signing TEE (e.g. trustworthy, not trustworthy, not tested) on the public register. The data owner may then verify who the board members are and decides if at least one of them or the combination of members (e.g. one law specialist, one hardware specialist, one software specialist and one independent non-governmental organization) in the board makes their opinion trustworthy.

In an embodiment, the result of the first measurement may be stored and communicated as a hash. For example, the code of the signing TEE may be hashed to produce a short digest, called hash.

Figure 4:
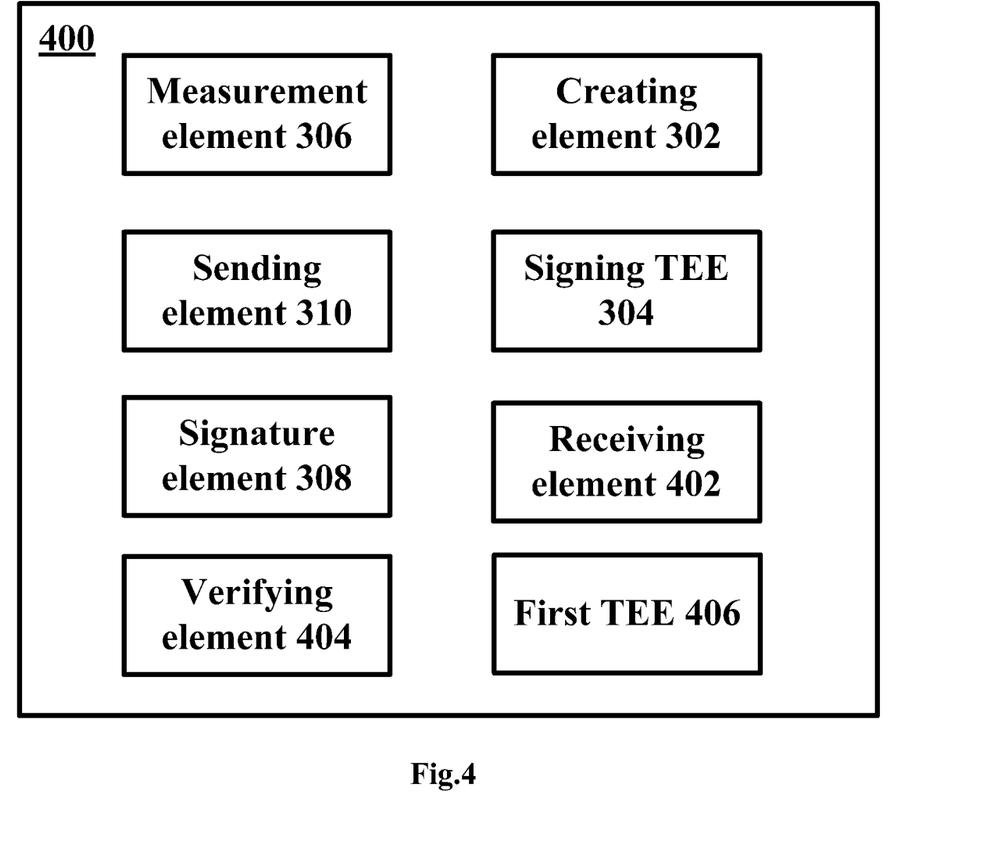
FIG. 4 depicts a simplified block diagram of an apparatus which is suitable for using in practicing the exemplary embodiments of the present disclosure.

FIG. 4 shows a simplified block diagram of an apparatus which is suitable for using in practicing the exemplary embodiments of the present disclosure. The apparatus 400 can be implemented as the TEE-enabling processor 112 as shown in FIG. 1. For some parts that have been described above with reference to FIG. 3, the description thereof is omitted herein for brevity.

In an embodiment, the signing TEE 304 may be programmed by the provider of the signing TEE. The apparatus 400 may further comprise a receiving element 402 configured to receive, from the provider of the signing TEE, the code of the signing TEE and a signature of the code of the signing TEE. For example, the provider of the signing TEE may generates a private-public key pair {skP,pkP}. The provider of the signing TEE may register with a manufacturer certification service of the TEE-enabling processor and is identified with its public key pkP. The provider of the signing TEE writes the code of the signing TEE and signs it. Then the provider of the signing TEE sends the code of the signing TEE and the signature to the TEE-enabling processor. The receiving element 402 receives the code of the signing TEE and the signature of the code of the signing TEE.

The apparatus 400 may further comprise a verifying element 404 configured to verify the signature of the code of the signing TEE. For example, the verifying element 404 can obtain the public key of the provider of the signing TEE from the manufacturer certification service of the TEE-enabling processor and then verify the signature of the code of the signing TEE. When the verification of the signature of the signing TEE is positive, the creating element 302 may create the signing TEE 304.

In an embodiment, the receiving element 402 receives the code of the first TEE such as computing TEE 406 and at least one signature associated with the code of the first TEE. For example, the at least one signature may be generated by at least one verifier such as the board of auditors, the data owner and a trusted user. For example, the provider of the computing TEE may write the code of the computing TEE 406 and send it to the public register such as blockchain. A plain language such as English, easy to understand by common users can also be included in for example the code of the computing TEE. The at least one verifier may verify that the code of the computing TEE performs what it is supposed to i.e. what is explained in plain language. If the at least one verifier believes that the code of the computing TEE is trustworthy, the at least one verifier may sign the code of the computing TEE, and then the code of the computing TEE and the signatures may be recorded on the public register.

Then the signing TEE 304 may determine, based on the at least one signature, whether the code of the first TEE 406 is recorded on the public ledger. For example, the signing TEE 304 may verify the at least one signature and determine whether the number of validated signatures is not smaller than a threshold. For example, if the number of validated signatures is not smaller than the threshold, the signing TEE 304 may determine that the code of the first TEE 406 is recorded on the public ledger. The threshold may be defined by any suitable value for example depending on the requirements of the trusted computing. For example, the threshold may be the number of members of the board of auditors.

The signing TEE 304 may sign the first TEE when the code of the first TEE is recorded on the public ledger. Then the creating element 302 may create the first TEE.

The measurement element 306 may perform a second measurement of the first TEE for example upon request of the provider of the first TEE or data owner. The second measurement may contain at least one measurement of the code of the first TEE, an identity of the first TEE 406 and a log of activities performing during the creation of the first TEE 406

The signature element 308 may generate a second signature of the result of the second measurement for example by using the private key of the TEE-enabling processor (i.e., the trusted element). The sending element 310 may send the result of the second measurement and the second signature to the public register such that a verification of the first TEE 406 can be made by means of the public register. For example, at least one verifier such as anybody, the board of auditors, the data owner and a trusted user can verify the first TEE by means of the public register.

In an embodiment, the result of the second measurement may be stored and communicated as a hash. For example, the code of the first TEE may be hashed to produce a short digest, called hash.

The verification of the first TEE may comprise checking the code of the first TEE, the result of second measurement of the first TEE, the validity of the second signature and its provenance with the manufacturer certification service. If the at least one verifier believes the first TEE is trustworthy, the at least one verifier may sign the code of the signing TEE and the second measurement, and record their signatures on the public register. The at least one verifier can officialise their opinions about the first TEE (e.g. trustworthy, not trustworthy, not tested) on the public register.

The first TEE 406 is proven to operate in a way that is publicly known and approved by the at least one verifier. The first TEE may use data from external data owners. The data owner may verify who at least one verifier is and decides if at least one of them or the combination of members makes their opinion trustworthy. The data owners may check if the identity (e.g., the public key) is certified. The data owner may check whether the TEE is approved. The data owner may check the identity of the TEE with manufacturer certification service of the TEE-enabling processor. The data owner may send data to the first TEE encrypted e.g. with the public key of the first TEE if the data owner trust the first TEE.

It is noted that the above verifications can be done no matter what the public register is because digital signatures cannot be forged (as long as the users use the right certification authorities, which is a standard assumption). However, if the public register is a distributed ledger controlled by a blockchain smart contract, extra functionalities can be added. Without the blockchain, users need to perform the whole list of verifications every time because the list of approved processors, programs, and auditors could change anytime. With a blockchain smart contract these list would be tamper-proof or only modified according to a tamper-proof set of rules. Therefore the users would only need to trust the smart contract once and for all and let the smart contract handle all the verifications.

The distributed ledger may contain lists of TEE-enabling processors, approved TEE codes, and auditors. The smart contract would contain rules to modify the above lists, such as How many auditor votes are needed to approve a TEE.
Some auditors may also have veto rights.
Under what conditions new auditors are accepted: auditor votes and/or user votes.

In an embodiment, the data used by the first TEE is stored and encrypted with a secret key related to the signing TEE or the first TEE. When the data is encrypted with a secret key related to the signing TEE, the sending element 310 may transfer/send the data to a second TEE as long as the second TEE is signed by the same signing TEE. This allows the first TEE is updated without asking for the data again. When the data is encrypted with a secret key related to the first TEE, the data cannot be transferred to first TEE so that the user knows the data it shared with a TEE will not be moved to a different unknown TEE.

Figure 5:
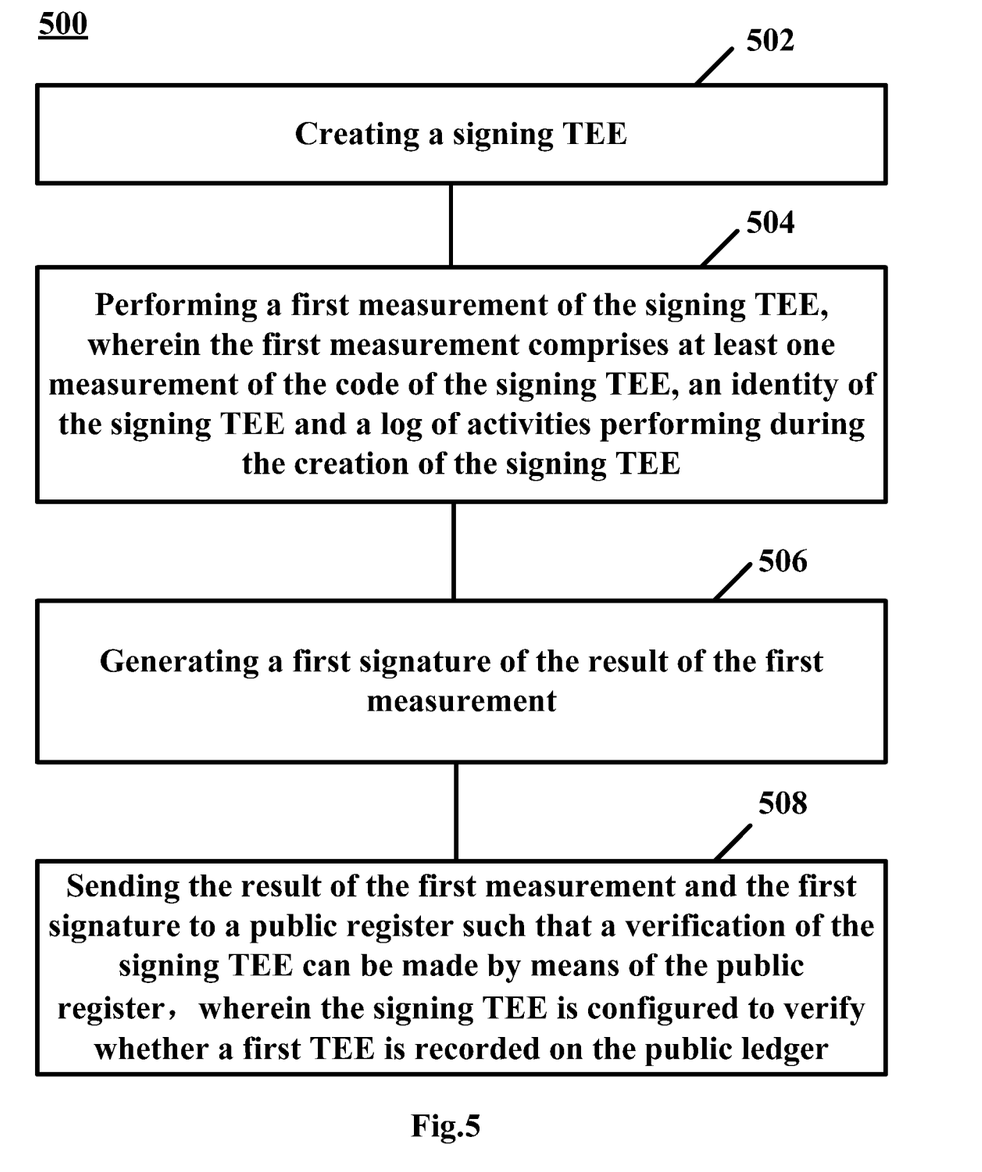
FIG. 5 illustrates a flow chart of a process for trusted computing according to an embodiment of the present disclosure.

FIG. 5 illustrates a flow chart of a process 500 for trusted computing according to an embodiment of the present disclosure. The process 500 can be performed by the TEE-enabling processor 112 as shown in FIG. 1. For some aspects which have been described above with some embodiments, the description of these aspects is omitted here for brevity.

As shown in the FIG. 5, the process 500 starts at block 502 where the TEE-enabling processor 112 may create a signing TEE.

At block 504, the TEE-enabling processor 112 may perform a first measurement of the signing TEE, wherein the first measurement comprises at least one measurement of the code of the signing TEE, an identity of the signing TEE and a log of activities performing during the creation of the signing TEE.

At block 506, the TEE-enabling processor 112 may generate a first signature of the result of the first measurement.

At block 508, the TEE-enabling processor 112 may send the result of the first measurement and the first signature to a public register such that a verification of the signing TEE can be made by means of the public register.

In various embodiments, the signing TEE is configured to verify whether a first TEE is recorded on the public ledger.

Figure 6:
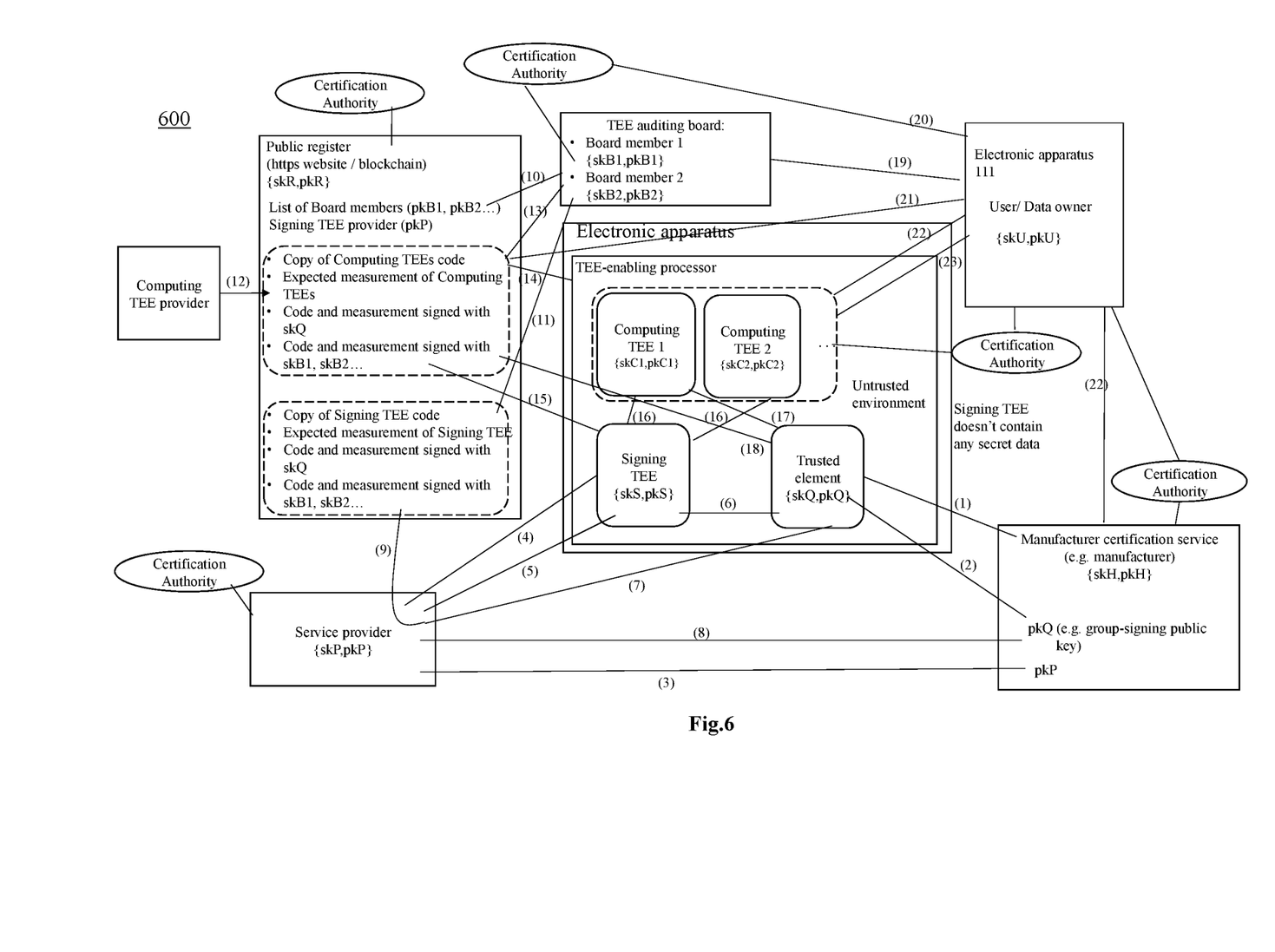
FIG. 6 illustrates a flow chart of a process for trusted computing according to another embodiment of the present disclosure.

FIG. 6 illustrates a flow chart of a process 600 for trusted computing according to another embodiment of the present disclosure. For some aspects which have been described above with some embodiments, the description of these aspects is omitted here for brevity.

At step (1), the TEE-enabling processor is provided with a trusted element that will be in charge of proving the identity of the TEE-enabling processor and attest that other TEEs on the TEE-enabling processor are indeed running on the TEE-enabling processor.

At step (2), the trusted element produces a private-public key pair {skQ,pkQ} (a group signing key pair in the case of Intel SGX). The public key pkQ is used to identify the TEE and thus the TEE-enabling processor. The public key pkQ is certified by a manufacturer certification service run by the manufacturer of the TEE-enabling processor.

Then the TEE-enabling processor is integrated by a vendor in a computing device such as a server. The device is delivered to the owner. The owner can use the device to provide the end service or offer the computing power of this device as a cloud facility to a service provider. This service provider (owner or cloud user), generates a private-public key pair {skP,pkP}.

At step (3), the end service provider registers with the manufacturer certification service and is identified with its public key pkP.

At step (4), the service provider writes the code of a signing TEE. The role of the signing TEE is to verify whether a first TEE such as computing TEE is recorded on the public ledger. If so, the signing TEE signs the computing TEE. The service provider signs the signing TEE code and then sends the signing TEE code and signature to the TEE-enabling processor.

At step (4), the TEE-enabling processor verifies the signature and creates the signing TEE. At creation, the signing TEE generates a private-public key pair {skS,pkS}.

At step (5), the signing TEE can then communicate its public key pkS to the service provider.

At step (6), upon request of the service provider, the TEE-enabling processor performs a measurement of the signing TEE and sends the result of the measurement to the trusted element such that the trusted element signs the signing TEE.

At step (7), the result of the measurement and the signature are sent back to the service provider.

At step (8), the service provider can verify the signature with the help of the manufacturer certification service.

At step (9), a copy of the code of the signing TEE, the measurement and the signature is sent by the service provider and recorded on a public register.

The public register could be a website with https authentication or a blockchain ledger. It provides potential users of the system with all the information they require to verify that the system will perform the computation it claims to perform.

Because normal users wouldn't have the expertise to verify the signing TEE by themselves, at least one verifier such as anybody, the board of auditors, the data owner and a trusted user be selected to make the technical verifications. In order to build trust with the users, the choice of the at least one verifier may be as diverse as possible ranging from trusted companies to governmental organisms, regulators or independent associations. Each verifier can officialise its opinion about the system (e.g. trustworthy, not trustworthy, not tested). The list of board members and their identifiers (such as public keys) can be recorded on the public register at step (10).

At step (11), the at least one verifier may check: the code of the TEE; the measurement of the signing TEE; the validity of the signature and its provenance with the manufacturer's certification service. If the at least one verifier believes the signing TEE is trustworthy, the at least one verifier signs the code of the signing TEE and the measurement and record their signatures on the public register.

The actual computations on the data of the data owner that will be performed by a computing TEE can be designed by anyone. It could be the service provider itself or external entities, researchers, data analysts, marketers. The computing TEE can be designed to perform any desired functionality.

At step (12), the provider of the computing TEE writes the code of the computing TEE and sends it to the public register such as a blockchain. A plain English, easy to understand by common users can also be provided together with the code of the computing TEE.

At step (13), the at least one verifier may verify that the code of the computing TEE performs what it is supposed to i.e. what is explained in plain English and sign the code of the computing TEE. Then the code of the computing TEE and their signatures may be stored on the public register.

At step (14), the code of the computing TEE is sent to the TEE-enabling processor, e.g. upon request of the service provider.

At step (15), the signing TEE verifies that the computing TEE is recorded on the public ledger.

At step (16), the signing TEE signs the computing TEE, and then the computing TEE is created together with a key pair.

At step (17), upon request of the service provider, the TEE-enabling processor performs a measurement of the computing TEE, and then the code of the computing TEE and its measurement are sent to the trusted element which signs the code of the computing TEE and its measurement.

At step (18), the code of the computing TEE and its measurement and signature are recorded on the public register.

At step (19), the data owner verifies who the at least one verifier is and decides if at least one of them or the combination of members makes their opinion trustworthy.

At step (20), the data owner checks if the identity (public key) is certified.

At step (21), the data owner checks that the TEEs are approved by the at least one verifier.

At step (22), the data owner checks the identity of the TEEs with the manufacturer certification service.

At step (23), the data owner sends data to the computing TEE encrypted e.g. with the public key of the TEE if she/he trusts the system.

In principle all these verifications (steps 19 to 23) can be done no matter what the public register is because digital signatures cannot be forged as long as the users use the right certification authorities, which is a standard assumption.

In any case the user could always verify the public register and decide to pull out its data if it is not happy with the system.

The embodiments of the present disclosure can provide the following advantage: This signing TEE has two advantages:

It automatizes the TEE approval without having to go through the service provider each time;

As it doesn't handle any secret data, it provides a separation between the service provider (who has a certain control over this TEE) and the TEEs who actually manipulate the secret data. The service provider directly signs the signing TEE but doesn't have direct control on the computing TEEs, which are signed by the signing TEE.

The system provides:

complete auditability of how the data are processed by anyone who wishes to verify it;

data security by proving that non-encrypted data never leaves the TEEs and therefore can never be seen by a human person;

means to build trust between non-expert users and the system by having expert auditors publicizing their approval;

data can be transferred from a TEE to another TEE as long as they are signed by the same signing TEE. This allows the service provider to update the TEE without asking for the data again.

It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of apparatus, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated in this disclosure may be implemented in various forms of hardware, software, or combinations thereof, for example, application specific integrated circuit(s) (ASICS), a functional circuitry, a graphics processing unit, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A method comprising, at a trusted execution environment (TEE)-enabling processor,
creating a signing TEE;
performing a first measurement of the signing TEE, wherein the first measurement comprises at least one measurement of the code of the signing TEE, an identity of the signing TEE and a log of activities performing during the creation of the signing TEE;
generating a first signature of the result of the first measurement;
sending the result of the first measurement and the first signature to a public register such that a verification of the signing TEE can be made by means of the public register;
wherein the signing TEE is configured to verify whether a first TEE is recorded on a public ledger.

2. The method of claim 1, further comprising:
receiving the code of the first TEE and at least one signature associated with the code of the first TEE;
determining, by the signing TEE, whether the code of the first TEE is recorded on the public ledger based on the at least one signature;
signing, by the signing TEE, the first TEE when the code of the first TEE is recorded on the public ledger;
creating the first TEE;
performing a second measurement of the first TEE, wherein the second measurement comprises at least one measurement of the code of the first TEE, an identity of the first TEE and logs of activities performing during the creation of the first TEE;
generating a second signature of the result of the second measurement; and
sending the result of the second measurement and the second signature to the public register such that a verification of the first TEE can be made by means of the public register.

3. The method of claim 1, wherein creating the signing TEE comprises:
receiving, from a provider of the signing TEE, the code of the signing TEE and a signature of the code of the signing TEE;
verifying the signature of the code of the signing TEE; and
creating the signing TEE when the verification of the signature of the code of the signing TEE is positive.

4. The method of claim 3, wherein sending the result of the second measurement and the second signature to the public register comprises:
sending the result of the first measurement and the first signature to the provider of the signing TEE such that the provider of the signing TEE can verify the first signature with a manufacturer certification service of the TEE-enabling processor and forward the result of the first measurement and the first signature to the public register.

5. An apparatus comprising:
at least one processor; and
at least one memory including computer program code for one or more programs, the at least one memory and the computer program code configured to, with the at least one processor, cause the apparatus to perform at least the following:
create a signing TEE;
perform a first measurement of the signing TEE, wherein the first measurement comprises at least one measurement of the code of the signing TEE, an identity of the signing TEE and a log of activities performing during the creation of the signing TEE;
generate a first signature of the result of the first measurement;
send the result of the first measurement and the first signature to a public register such that a verification of the signing TEE can be made by means of the public register;
wherein the signing TEE is configured to verify whether a first TEE is recorded on a public ledger.

6. The apparatus of claim 5, wherein the memory and computer program code are further configured to, with the processor, cause the apparatus to:
receive the code of the first TEE and at least one signature associated with the code of the first TEE;
wherein the signing TEE is further configured to determine whether the code of the first TEE is recorded on the public ledger based on the at least one signature and to sign the first TEE when the code of the first TEE is recorded on the public ledger;
create the first TEE;
perform a second measurement of the first TEE, wherein the second measurement comprises at least one measurement of the code of the first TEE, an identity of the first TEE and logs of activities performing during the creation of the first TEE;
generate a second signature of the result of the second measurement; and
send the result of the second measurement and the second signature to the public register such that a verification of the first TEE can be made by means of the public register.

7. The apparatus of claim 5, wherein the memory and computer program code are further configured to, with the processor, cause the apparatus to:
receive, from a provider of the signing TEE, the code of the signing TEE and a signature of the code of the signing TEE;
verify the signature of the code of the signing TEE; and
create the signing TEE when the verification of the signature of the signing TEE is positive.

8. The apparatus of claim 7, wherein the memory and computer program code are further configured to, with the processor, cause the apparatus to:
send the result of the first measurement and the first signature to the provider of the signing TEE such that the provider of the signing TEE can verify the first signature with a manufacturer certification service of the TEE-enabling processor and forward the result of the first measurement and the first signature to the public register.

9. The apparatus of claim 7, wherein the service provider registers with the manufacturer certification service of the TEE-enabling processor and is identified with the service provider's public key.

10. The apparatus of claim 5, wherein the memory and computer program code are further configured to, with the processor, cause the apparatus to:
produce a private-public key pair, the public key is used to identify the TEE-enabling processor and the TEE-enabling processor is certified by a manufacturer certification service of the TEE-enabling processor.

11. The apparatus of claim 5, wherein the result of the first measurement and/or the result of the second measurement is stored and communicated as a hash.

12. The apparatus of claim 5,
wherein the verification of the signing TEE comprises checking at least one of the code of the signing TEE, the result of the first measurement of the signing TEE, the validity of the first signature and the provenance of the first signature,
wherein the verification of the first TEE comprises checking at least one of the code of the first TEE, the result of the second measurement of the first TEE, the validity of the second signature and the provenance of the second signature.

13. The apparatus of claim 5, wherein the memory and computer program code are further configured to, with the processor, cause the apparatus to:
to receive data from a data owner, wherein the data is encrypted with a public key of the first TEE.

14. The apparatus of claim 5, wherein the public register is a website with https authentication or a distributed ledger controlled by a blockchain smart contract.

15. The apparatus of claim 14, wherein the distributed ledger contains lists of the TEE-enabling processor, approved TEE codes, and auditors, and the smart contract contains at least one rule to modify the lists.

16. The apparatus of claim 5, wherein the data used by the first TEE is stored and encrypted with a secret key related to the signing TEE or the first TEE.

17. The apparatus of claim 16, wherein the data used by the first TEE is encrypted with a secret key related to the signing TEE and a second TEE is signed by the signing TEE, wherein the memory and computer program code are further configured to, with the processor, cause the apparatus to send the stored data to the second TEE.

18. The method of claim 5, wherein the verification of the signing TEE, the verification of the first TEE and the at least one signature associated with the code of the first TEE are made by at least one of a board of auditors, a data owner and a trusted user.

19. A non-transitory computer program comprising instructions for causing an apparatus to perform at least the following:
create a signing TEE;
perform a first measurement of the signing TEE, wherein the first measurement comprises at least one measurement of the code of the signing TEE, an identity of the signing TEE and a log of activities performing during the creation of the signing TEE;
generate a first signature of the result of the first measurement;
send the result of the first measurement and the first signature to a public register such that a verification of the signing TEE can be made by means of the public register;
wherein the signing TEE is configured to verify whether a first TEE is recorded on the public ledger.

* * * * *